United States Patent
Saario et al.

[11] Patent Number: 6,104,918
[45] Date of Patent: Aug. 15, 2000

[54] METHOD FOR CONTROLLING TRANSMITTING POWER AND RADIO SYSTEM

[75] Inventors: Eija Saario; Oscar Salonaho, both of Helsinki, Finland

[73] Assignees: Nokia Telecommunications OY; Nokia Mobil Phones Ltd., both of Espoo, Finland

[21] Appl. No.: 08/913,869

[22] PCT Filed: Jan. 17, 1997

[86] PCT No.: PCT/FI97/00022

§ 371 Date: Sep. 16, 1997

§ 102(e) Date: Sep. 16, 1997

[87] PCT Pub. No.: WO97/26716

PCT Pub. Date: Jul. 24, 1997

[30] Foreign Application Priority Data

Jan. 19, 1996 [FI] Finland ..................................... 960276

[51] Int. Cl.[7] ................................................... H01Q 11/12
[52] U.S. Cl. ............................. 455/126; 455/69; 455/572
[58] Field of Search ........................... 455/62.1, 69, 115, 455/126, 127, 108, 113, 116, 117, 572

[56] References Cited

U.S. PATENT DOCUMENTS

| | | | |
|---|---|---|---|
| 5,129,098 | 7/1992 | McGirr et al. | 455/69 |
| 5,524,287 | 6/1996 | Yokoya et al. | 455/126 |
| 5,574,993 | 11/1996 | Kobayashi et al. | 455/126 |
| 5,689,815 | 11/1997 | Yamazaki et al. | 455/69 |

FOREIGN PATENT DOCUMENTS

| | | |
|---|---|---|
| 0 696 857 | 2/1996 | European Pat. Off. . |
| 91/21196 | 11/1992 | WIPO . |
| 94/06217 | 3/1994 | WIPO . |
| 94/19876 | 9/1994 | WIPO . |
| 96/02097 | 1/1996 | WIPO . |
| 96/09696 | 3/1996 | WIPO . |
| 96/19048 | 6/1996 | WIPO . |

OTHER PUBLICATIONS

Su, et al. "Reverse–Link Power Control Strategies for CDMA Cellular Network", IEEE, 1995, pp. 461–465.

Chang, et al. "Adaptive Fuzzy Power Control for CDMA Mobil Radio Systems", 1994 International Symposium on Artificial Neural Networks, ISAAN'94, 757–763, Taiwan.

*Primary Examiner*—Reinhard J. Eisenzopf
*Assistant Examiner*—Sam Bhattacharya
*Attorney, Agent, or Firm*—Pillsbury Madison & Sutro

[57] ABSTRACT

A radio system and a method for controlling transmitting power in the radio system, the radio system being composed of at least one base station communicating with one or more subscriber terminals located within a coverage area. The transmitting power of each subscriber terminal is controlled stepwise by power control commands and the step size of a change in transmitting power is adjusted separately for each connection. In order to achieve an accurate and fast power control, the step size is adjusted on the basis of several received successive power control commands by calculating, from the power control commands, the number of two successive commands in different directions in proportion to the number of commands examined, the calculated proportion is compared to a reference value and the step size is adjusted on the basis of that comparison.

16 Claims, 1 Drawing Sheet

METHOD FOR CONTROLLING TRANSMITTING POWER AND RADIO SYSTEM

This application is the national phase of International application PCT/FI97/00022, filed Jan. 17, 1997, which designated the U.S.

FIELD OF TECHNOLOGY

The invention relates to a method for controlling transmitting power in a radio system comprising one base station or several base stations communicating with subscriber terminal equipments located within its area, in which method the transmitting power of the equipments is controlled stepwise by power control commands and the step size of a change in transmitting power is adjusted separately for each connection.

PRIOR ART

It is typical of a cellular radio environment that the Propagating conditions of radio waves vary constantly. Both in a signal received by a subscriber terminal equipment and in a signal received by a base station, constant variation, i.e. fading, occurs. In fading of the signal, two different types of phenomena may be distinguished. Fading may be either fast or slow and both phenomena usually occur simultaneously.

Fast fading of a signal is caused by multi-path propagation typical of a cellular radio environment, where a signal propagates along several different routes between a transmitter and a receiver. Signal components arriving at the receiver different ways are summed in the receiver, and depending on the mutual phase differences between the signal components, they either amplify or attenuate each other. The level of the signal may vary considerably, up to dozens of decibels, along a distance of less than half a wavelength already.

Slow fading of a signal, in turn, is caused by the fact that, on the radio path, there is a varying number of factors causing additional attenuation, such as natural obstacles or buildings. The effect of slow fading on the signal consists, as its name suggests, of one grade slower variation in the signal strength than that caused by fast fading, which causes strong power variations around the envelope curve caused by slow fading.

Due to the above-mentioned constant strength variation of the received signal, the transmitting power used by a subscriber terminal equipment and a base station must be monitored continuously and efforts must be made to control it suitable at each moment of time. The aim of power control is to keep the transmitting power of the device as low as possible, still maintaining a sufficient quality of a connection so that the signal will not interfere with other connections and so that the power consumption of a portable terminal equipment in particular will be small.

Controlling the transmitting power is generally based on monitoring the power of the received signal to be carried out in the receiver. The control may be implemented for instance by means of power control messages transmitted by a controlling device to the transmitter to be controlled. A power control message comprises an instruction for increasing or decreasing the transmitting power by some power quantity or step.

As an example of an implementation of power control according to prior art is presented the International Patent Application PCT/US92/04161 "Method and apparatus for controlling transmission power in a CDMA cellular mobile telephone system". In the method according to the publication, power control messages are utilized, by which the transmitting power of the transmitter to be controlled is decreased or increased stepwise. In the present solution, the step size is constant.

Keeping the step size of the power control constant causes problems in situations in which the signal or the interference level change from time to time, but still not continuously. Such a situation arises in a WLL (Wireless Local Loop) system, for instance, where the subscriber terminal equipments are fixedly located or changes in signal level are generally rather small. On the other hand, changes in interference level at times cause even great changes in the signal-to-interference ratio.

If the power control of a radio system is carried out by means of a large fixed step size, the problem is a strong fluctuation of the used power around the desired power level. This concerns particularly the WLL system, in which channel changes usually are small. On the other hand, if the step size of the power control is small, there is a risk that the power control algorithm is not capable of following fast variations in the signal-to-interference ratio.

The publication Su S.-L., Shieh S.-S.: Reverse-Link Power Control Strategies for CDMA Cellular Network, Sixth IEEE Int. Symposium on Personal, Indoor and Mobile Communications, PIMRC'95, Toronto, Sep. 27 to 29, 1995, referred to here, discloses a method in which the transmitting power is controlled stepwise and the step size can be adjusted separately for each connection. In this method, two successive power control commands are utilized, on the basis of which the step size is changed. Even though the described method is better the previous method using constant step, the control is still rough.

Characteristic Features of the Invention

The object of the present invention is to realize the power control of the radio system in such a way that no strong fluctuation occurs around the desired power level and that the power control still is capable of following the changes in the desired signal level rapidly.

This is achieved by means of a method of the type described in the preamble, which method is characterized in that the step size is adjusted on the basis of several received successive power control commands in such a way that from the power control commands to be examined is calculated the number of two successive commands in different directions in proportion to the number of the commands to be examined and that the calculated proportion is compared to one or several predetermined reference values, and that the step size is adjusted on the basis of said comparison.

The invention relates further to a radio system, the transceivers of which carry out transmitting power control stepwise by means of power control commands separately for each connection by varying steps. The radio system of the invention is characterized in that the transceivers of the system comprise means for storing information relating to successive power control commands, means for calculating from the stored information the proportion of the number of two successive commands in different directions to the number of the commands to be examined, means for comparing the obtained proportion to a predetermined reference value and means for adjusting the step size on the basis of the comparison.

By means of the method of the invention, a fast and accurate power control is achieved. In a preferred embodiment of the invention, the signal-to-interference ratio of the signal is followed and the step size is changed on the basis of the behaviour of the interference level to be larger or smaller. The step size can be changed without extra signalling.

In another embodiment of the invention, conclusions are drawn from the power control commands concerning whether the step size is too large or small.

DESCRIPTION OF FIGURES

In the following, the invention is described in greater detail with reference to the examples according to the attached drawings, in which.

DESCRIPTION OF PREFERRED EMBODIMENTS

A preferred embodiment of the method according to the invention is examined next by using a WLL system as an example without being restricted to that, however. Correspondingly, the solution of the invention is applicable also to cellular and other radio systems, as is obvious to one skilled in the art.

Figure 1:
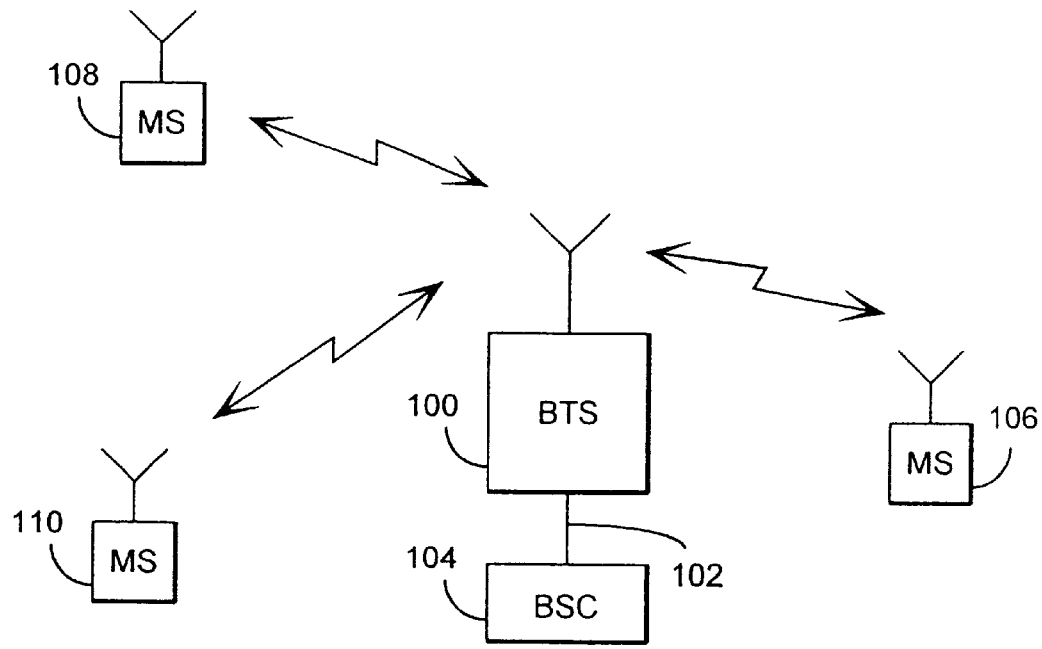
FIG. 1 shows a radio system to which the method of the invention can be applied.

FIG. 1 shows a schematic diagram of a WLL system, to which the method of the invention preferably can be applied. Accordingly, WLL systems are systems in which a radio telephone system is used for replacing a conventional telephone line network. In a WLL system, the subscriber terminal equipments are fixedly mounted in user premises like a conventional telephone. The structure of the system is similar to that of a conventional cellular radio system. The example system in FIG. 1 comprises a base station 100 connected by means of a digital transfer link 102 to a base station controller 104 and through that further to the other parts of the system and to a fixed telephone network.

Moreover, the system comprises a number of subscriber terminal equipments 106 to 110, which are fixedly mounted for instance in each subscriber's apartment like a traditional telephone. The terminal equipments communicate over the radiopath with base stations, typically with the base station which offers a connection of the best quality. It shall be considered that, in an actual system, the number of terminal equipments naturally is substantially higher than in the example of FIG. 1.

The power control method according to the invention can be applied both to a base station and to a subscriber terminal equipment. In the following, a falling transfer direction, i.e. a transmission from a base station to a terminal equipment, is examined by way of example. Accordingly, let us assume that the terminal equipment transmits power control messages to the base station. The power control messages can be implemented in manners known per se.

The base station receives power control messages at given intervals from the subscriber terminal equipment. The principle of the solution according to the invention is that if a power increasing command is generally followed by a power decreasing command, the power control step is too large and it can be made smaller. Then the transmitting power remains more accurately as desired. In the opposite case, i.e. if generally parallel commands come one after the other, e.g. a number of power increasing commands come one after the other, the power control step can be increased.

Let us assume that a transceiver stores information of the received power control messages in a vector having some predetermined length. To the vector is added information of new messages always when they arrive or at predetermined intervals. Then the oldest information is removed simultaneously.

Information of changes in the direction of successive power control commands is stored in the vector. If a power increasing command is followed by a power increasing command, the value of the newest element of the vector is set to '1'. If a power decreasing command is followed by a power decreasing command, the value of the newest element of the vector is set to '1', correspondingly. If a power increasing command is followed by a power decreasing command or a power decreasing command is followed by a power increasing command, the value of the newest element of the vector is set to '0'. Subsequently, the number $PRO_0$ of '0' values included in the vector is calculated in proportion to the length of the vector. This calculated proportion $PRO_0$ is compared to a predetermined threshold value $TRE_0$.

If the proportion is bigger than the set threshold value, the step size of power control is changed according to the following formula:

$$PC_{step\ size}(t+1) = PC_{step\ size}(t) - \frac{PRO_0}{THE_0} \cdot CH$$

where CH is the minimum power value of step size adjustment. The step size is thus made smaller. It is, however, possible to determine a minimum value for the step size, below which value the step size does not fall.

If the proportion is smaller than the set threshold value, the step size of power control is changed according to the following formula:

$$PC_{step\ size}(t+1) = PC_{step\ size}(t) + \frac{1 - PRO_0}{THE_0} \cdot CH$$

The step size is thus increased. It is, however, possible to determine a maximum value for the step size, which value the step size does not exceed.

If the proportion is equal to the set threshold value, the step size of power control is not changed.

The above procedure can be repeated always when the next power control command is received or at desired intervals. If the vector length is k elements, an updating can be made for instance at intervals of k+1 received commands.

According to a preferred embodiment of the invention, threshold values of different sizes, $THE_1$ and $THE_2$, can be determined for an increase and decrease of the step size. Then, if the obtained proportion $PRO_0$ is greater than or equal to the $THE_1$ and smaller than or equal to the $THE_2$, the step size is not changed.

Further, according to another preferred embodiment of the invention, the size of that vector in which the information of the changes in the direction of successive power control commands is stored is not constant, but it can be changed as per situation.

Some possible values for the above-mentioned variables are, for instance, step size minimum value 0.1 dB, step size maximum value 0.7 dB, threshold value 0.5, minimum power value of step size adjustment 0.005 dB and vector size of 2 to 6 elements. The above values have been obtained by simulations in a WLL environment, but in a practical system the variables obtain values depending on each system and environment, which values may differ from the above-mentioned ones mentioned only as an example.

Advantages of the solution according to the invention arise from the fact that the step size can be adjusted according to the invention as small as possible, due to which the power control is accurate, but if necessary, the step size can be increased rapidly in varying circumstances.

Figure 2:
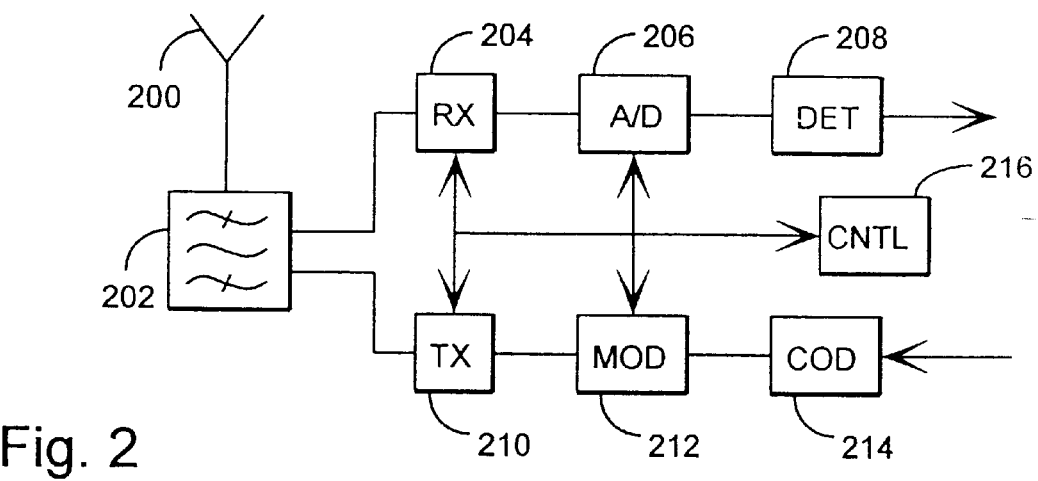
FIG. 2 illustrates an example of the structure of a transceiver of the system according to the invention.

In the following, the structure of a transceiver to be used in a radio system according to the invention is examined. FIG. 2 illustrates one transceiver of the radio system, to which transceiver the method of the invention can be applied. The transceiver can either be located in the base station equipment or it can be a subscriber terminal equipment. The structure of the equipment is in both alternatives identical as to the parts substantial for the invention.

In transmitting direction, the transceiver comprises means 214 for coding a transmitting signal, the output of which means is operationally connected to the input of modulating means 212, the output signal of which means is brought to a transmitter unit 210. In the transmitter unit, the signal is converted to a radio frequency and amplified. From the transmitter unit the signal is brought via a duplex filter 202 to an antenna 200.

In receiving direction, the transceiver further comprises a receiver unit 204, to which a signal received by the antenna 200 is brought via the duplex filter 202. In the receiver unit 204, the received signal is converted to an intermediate frequency, and the out-put signal of the unit is operationally connected to the input of converter means 206. In the converter means, the signal is converted to a digital form. The converted signal is brought to detector means 208, from which the detected signal is brought further to the other parts of the receiver. In addition, the equipment comprises control and calculation means 216, which control the operation of the other blocks mentioned above. The control and calculation means are typically implemented by means of a processor or a separate logic.

The transceiver according to the invention comprises means 216 for storing information relating to successive power control commands, such as information of the direction of a power control command in form of a vector, means 216 for calculating from the stored information the proportion of the number of two successive commands in different directions to the number of the commands to be examined, means 216 for comparing the obtained proportion to a predetermined reference value and means 216 for making the step size of power control smaller if the proportion is greater than the reference value and for making the step size of power control larger if the proportion is smaller than the reference value. The means 216 can also calculate the magnitude of a change in step size on the basis of how much the calculated proportion differs from the set reference value. The described operations can be implemented by means of a control processor, which carries out the calculations and transmits the information to the different parts of the transmitter. The corresponding operations can also be carried out by means of separate logic and memory circuits, as is obvious to one skilled in the art.

Though the invention has been described above referring to the example of the attached drawings, it is clear that the invention is not restricted to that, but it can be modified in many ways within the scope of the inventive idea set forth in the enclosed claims.

What is claimed is:

1. A method for controlling transmitting power in a radio system comprising one base station or several base stations (100) communicating with subscriber terminal equipments (106 to 110) located within its area, in which method the transmitting power of the equipments is controlled stepwise by a control commands such that a difference in transmitting power level exists between adjacent steps and the step size of a change in transmitting power is adjusted separately for each connection, characterized in that the step size is adjusted on the basis of several received successive power control commands in such a way that from the power control commands to be examined is calculated the number of two successive commands in different directions in proportion to the number of the commands to be examined and that the calculated proportion is compared to one or several predetermined reference values, and that the difference in transmitting power level between adjacent steps is adjusted on the basis of said comparison.

2. A method according to claim 1, characterized in that if the calculated proportion is greater than the given reference value, the step size is made smaller, and if the calculated proportion is smaller than the reference value, the step size is increased, and if the proportion is equal to the reference value, the step size is not changed.

3. A method according to claim 1, characterized in that the magnitude of a change in step size depends on how much the calculated proportion differs from the reference value.

4. A method according to claim 1, characterized in that the number of successive power control commands to be used for adjusting the step size is constant and that each time a new power control command arrives the oldest command is left outside the number to be examined.

5. A method according to claim 1, characterized in that the number of successive power control commands to be used for adjusting the step size is constant and that the number of commands is updated by new commands at given time intervals.

6. A method according to claim 1, characterized in that the number of successive power control commands to be used for adjusting the step size is adjusted for each connection.

7. A method according to claim 1 characterized in that an upper and a lower limit have been set for the step size of a change in transmitting power.

8. A method according to claim 1, characterized in that threshold values of different sizes are used to increase and decrease a change in step size.

9. A radio system comprising transceivers (100, 106 to 110), which carry out transmitting power control stepwise by means of power control commands separately for each connection by varying steps, characterized in that the transceivers (100, 106 to 110) of the system comprise means (216) for storing information relating to successive power control commands such that a difference in transmitting power level exists between adjacent steps, means (216) for calculating from the stored information the proportion of the number of the commands to be examined, means (216) for comparing the obtained proportion to a predetermined reference value and means (216) for adjusting the difference in transmitting power level between adjacent steps on the basis of the comparison.

10. A system according to claim 9, characterized in that the transceivers (100, 106 to 110) of the system comprise means (216) for decreasing the step size of power control if the proportion is greater than the reference value, and for increasing the step size of power control if the proportion is smaller than the reference value.

11. A system according to claim 9, characterized in that the transceivers (100, 106 to 110) of the system comprise means (216) for calculating the magnitude of a change in step size on the basis of how much the calculated proportion differs from the set reference value.

12. A method according to claim 2, characterized in that an upper and a lower limit have been set for the step size of a change in transmitting power.

13. A method according to claim 3, characterized in that an upper and a lower limit have been set for the step size of a change in transmitting power.

14. A method according to claim 4, characterized in that an upper and a lower limit have been set for the step size of a change in transmitting power.

15. A method according to claim 5, characterized in that an upper and a lower limit have been set for the step size of a change in transmitting power.

16. A method according to claim 6, characterized in that an upper and a lower limit have been set for the step size of a change in transmitting power.

* * * * *

UNITED STATES PATENT AND TRADEMARK OFFICE
CERTIFICATE OF CORRECTION

PATENT NO. : 6,104,918  
DATED : August 15, 2000  
INVENTOR(S) : Saario et al.

Page 1 of 1

It is certified that error appears in the above-identified patent and that said Letters Patent is hereby corrected as shown below:

Please change "[73] Assignees: Nokia Telecommunications OY; Nokia Mobil Phones Ltd., both of Espoo, Finland"

TO

-- [73] Assignees: Nokia Telecommunications OY; Nokia Mobile Phones Ltd., both of Espoo, Finland --

Signed and Sealed this

Twenty-first Day of August, 2001

*Attest:*

Nicholas P. Godici

NICHOLAS P. GODICI  
*Acting Director of the United States Patent and Trademark Office*

*Attesting Officer*